United States Patent [19]

Silverberg

[11] 4,391,505

[45] Jul. 5, 1983

[54] OVER-PLATEN DOCUMENT REGISTRATION APPARATUS

[75] Inventor: Morton Silverberg, Rochester, N.Y.

[73] Assignee: Xerox Corporation, Stamford, Conn.

[21] Appl. No.: 312,461

[22] Filed: Oct. 19, 1981

[51] Int. Cl.³ .......................................... G03G 15/04
[52] U.S. Cl. ................................. 355/3 R; 271/259; 355/3 SH; 355/75
[58] Field of Search ............... 355/3 R, 3 SH, 14 SH, 355/75; 271/258, 259, 265

[56] References Cited

U.S. PATENT DOCUMENTS

| | | | |
|---|---|---|---|
| 2,904,700 | 9/1959 | Rockey | 250/225 |
| 3,108,727 | 10/1963 | Farber | 226/20 |
| 3,473,035 | 10/1969 | Gardner et al. | 250/219 |
| 3,504,908 | 4/1970 | Krueger | 271/10 |
| 3,536,320 | 10/1970 | Derby | 271/50 |
| 3,844,552 | 10/1974 | Bleau et al. | 271/245 |
| 3,880,521 | 4/1975 | Eppe et al. | 355/75 X |
| 3,941,376 | 3/1976 | Liechty et al. | 271/275 |
| 3,998,541 | 12/1976 | Michaloski | 355/11 |
| 4,000,943 | 1/1977 | Bar-on | 355/8 |
| 4,033,574 | 7/1977 | Stange et al. | 271/3 |
| 4,043,665 | 8/1977 | Caldwell | 355/76 |
| 4,062,061 | 12/1977 | Batchelor et al. | 364/900 |
| 4,076,408 | 2/1978 | Reid et al. | 355/14 |
| 4,078,787 | 3/1978 | Burlew et al. | 271/3.1 |
| 4,099,860 | 7/1978 | Connin | 355/14 |
| 4,118,119 | 10/1978 | Maiorano | 355/11 |
| 4,125,325 | 11/1978 | Batchelor et al. | 355/26 |
| 4,132,401 | 1/1979 | Gauronski et al. | 271/245 |
| 4,144,550 | 3/1979 | Donohue et al. | 364/107 |
| 4,146,220 | 3/1979 | Barton | 271/233 |
| 4,146,797 | 3/1979 | Nakagawa | 250/548 |
| 4,158,500 | 6/1979 | DiFrancesco et al. | 355/14 |
| 4,169,674 | 10/1979 | Russel | 355/14 |
| 4,176,945 | 12/1979 | Holzhauser et al. | 355/23 |
| 4,179,215 | 12/1979 | Hage | 355/50 |
| 4,200,391 | 4/1980 | Sakamoto et al. | 355/14 E |
| 4,229,101 | 10/1980 | Hamlin et al. | 355/77 |
| 4,250,538 | 2/1981 | Durbin et al. | 362/97 |
| 4,251,919 | 2/1981 | Brown | 33/168 B |
| 4,278,344 | 7/1981 | Sahay | 355/14 |
| 4,281,919 | 8/1981 | Nomura et al. | 355/50 |
| 4,283,773 | 8/1981 | Daughton et al. | 364/900 |
| 4,284,270 | 8/1981 | Silverberg | 271/166 |
| 4,286,870 | 9/1981 | Silverberg | 355/76 |

FOREIGN PATENT DOCUMENTS 55-155250 11/1980 Japan.

OTHER PUBLICATIONS

"Document Position Sensor", by Denis J. Stemmle, Xerox Disclosure Journal, vol. 6, No. 4, Jul./Aug. 1981, pp. 185-186.

"Lead Edge Sensor", by David D. Johnson and Ernest B. Page, Xerox Disclosure Journal, vol. 6, No. 4, Jul.-/Aug. 1981, pp. 199-200.

Primary Examiner—Fred L. Braun

[57] ABSTRACT

In an original document sheet feeding 10 and registration apparatus for a copier 12, in which a document sheet 14 is fed with a document feeding belt 11 over the imaging station 16 of the copier, the imaging station having a copying lens 20 in an integrating optical cavity 22 under the platen 16, document registration is provided on the platen 16 without impacting the document edge, using at least one minor spectrally reflective patch 38, 44, 54 on the otherwise diffusely light reflective surface 37 of the document belt 11, and feeding the document sheets onto the belt 11 in synchronism with the spectral patches with an edge of the document partially overlying a patch, and detecting the edge of the document sheet over the platen and within but off-axis the field of view of the copier lens 20 with a photosensor system 30, 46 which is in the optical cavity but optically invisible to the copier and aimed at a registration position 21, 46 on the platen for detecting the change there in the light level from a separate sensor light source 32, 40 reflected from a spectral patch relative to a partially overlying (diffusely reflective) document, even though both the belt and document are "white".

12 Claims, 4 Drawing Figures

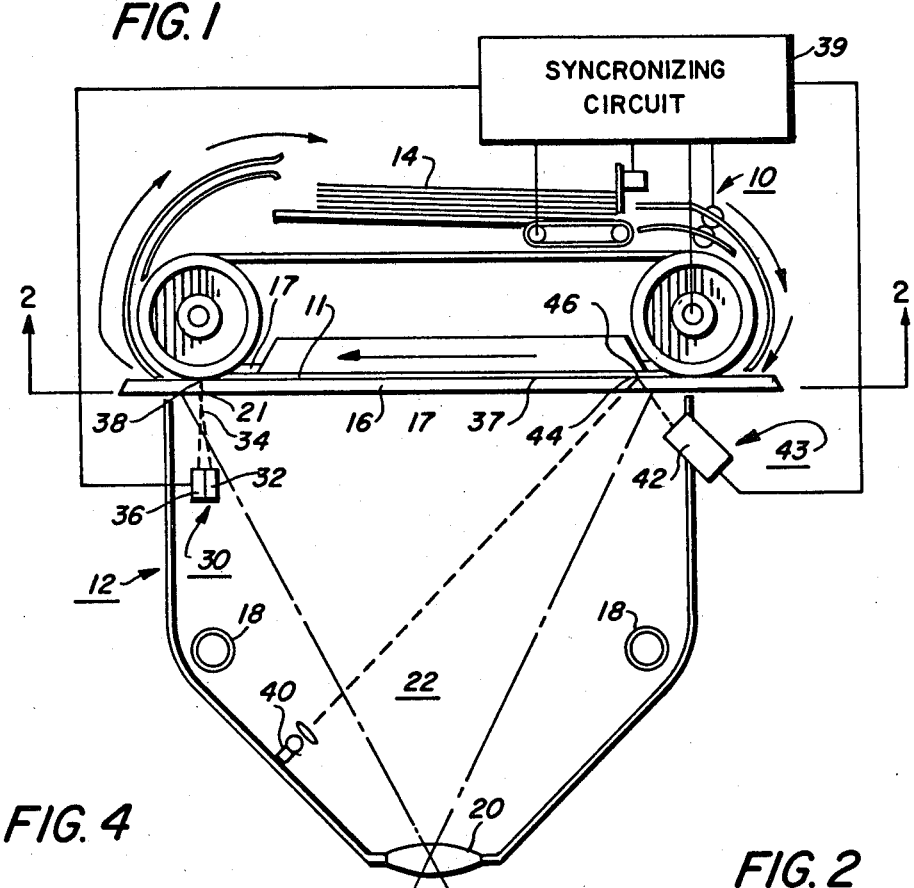
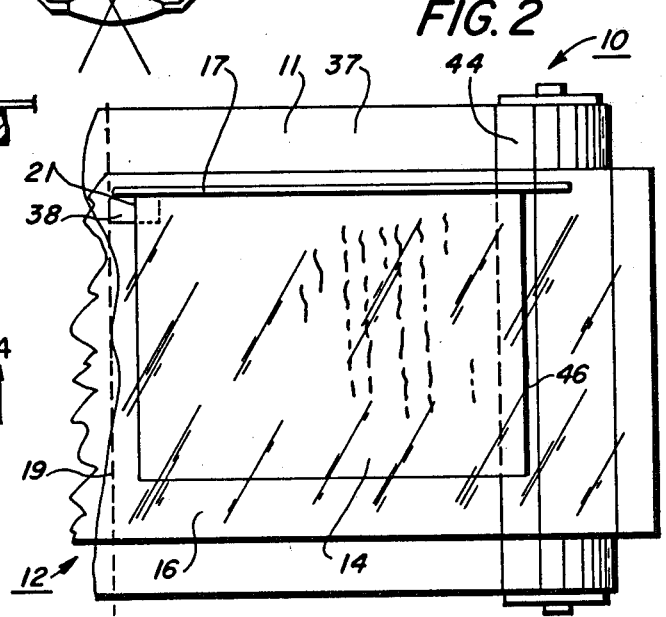
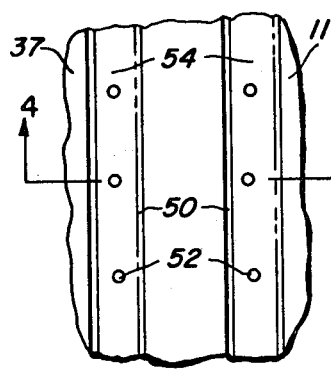
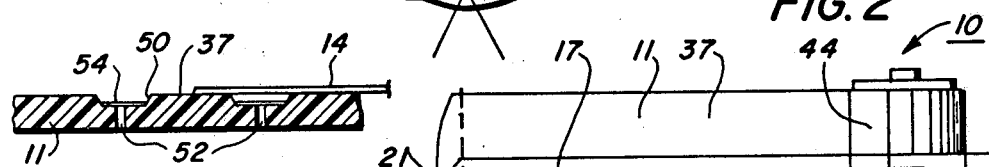

OVER-PLATEN DOCUMENT REGISTRATION APPARATUS

A document registration apparatus for registering a document sheet over the transparent window of a copier, and, more particularly, in which the registration apparatus is optical and yet optically invisible to the copier.

For the faster xerographic and other document copiers now in commercial use, it is increasingly desirable to provide for the automatic handling of the individual original document sheets being copied, in order to more fully utilize the higher speed copying capabilities of those copiers. It is desirable to be able to semi-automatically or automatically feed, register and copy sets of documents with a mixture of sizes, types, and conditions, without document jams or document wear or damage even though such documents can vary widely in sheet size, weight, thickness, material, condition and susceptibility to damage by the document feeding and registration apparatus.

Such a document handling system is preferably one which utilizes an existing or generally conventional copier optical imaging system including the external transparent copying window (known as the platen) of the copier. It is also desirable that the document handling system alternatively allow the copier operator to conventional manually place documents, including books, on the same copying platen. Such a manual copying registration position is conventionally provided by a fixed raised registration edge or edges extending linearly along one or two sides of the platen, fixed to the copier body or fixed along one or two edges of the platen glass. It is desirable for the automatic document handler to automatically register the document at an existing or conventional such manual registration position on the platen.

One of the most important, and difficult to achieve, requirements for automatic or semi-automatic document handling is the accurate and reliable, but safe, transporting of the original document into the proper registration position for copying. Conventionally the document is desirably automatically accurately center registered or corner registered (depending on the copier) by the document handler at a pre-set registration position relative to the copier platen, with one (or two) edge(s) of the document aligned adjacent one (or two) edge(s) of the copier platen. This registration accuracy is desirably within less than 1 millimeter. If the document is not properly registered, or slips after registration, it will be misaligned relative to the copy. Thus undesirable dark borders and/or edge shadow images may appear on the ensuing copy, or information at the edges of the document may not be copied.

Both document feeding and registration wear or damage problems are greatly aggravated by precollation copying, which provides collated output copy sets ready for on-line finishing without a sorter or collator, but requires repeated feeding and registration of each document. In fact each document must be recirculated to and from the registration position by the number of times equal to the number of copies. This is further described in recirculating document systems patents cited herein.

Various known document handling systems have been provided with various document transports to move the original document sheets over the copier platen and into and out of registration. The document transports may comprise single or multiple belt transports, or feed wheels, utilizing frictional, vacuum, or electrostatic driving forces. Various combinations of such over-platen transports are known with various registration devices or systems. Several are disclosed in references cited below.

It is known in the art to register the original document for copying at the appropriate position relative to the platen in various ways. Typically a document sheet is registered by driving it against a gate or stop. This may comprise projecting aligned fingers, or roller nips, or a fixed vertical surface, at the desired registration line, against which an edge of the document sheet is driven into abutment.

The type of document transport and registration system is affected by the type of copier optics, i.e., the copying system. In a constant velocity transport (CVT) system, in which the document is copied by being moved at a constant velocity over a narrow scanning window of a fixed optics system by the document transport, it is generally preferable to preregister the document to its transport just before the document is transported over the copying window, as disclosed for example in U.S. Pat. No. 3,536,320 issued Oct. 27, 1970 to D. R. Derby. On the other hand, in most other types of copying systems the document is registered overlying a full document sized (full frame) platen. In such systems the document is either optically scanned while it is held stationary over the platen, or optically stopped by flash illumination and imaging of the entire document when the document reaches the registration position over the platen. In full frame systems the document is preferably registered to a pre-set position (line) over the platen glass adjacent one side or edge thereof. Normally this is a fixed abutment or retractable stop along the edge of the platen. However, as disclosed in U.S. Pat. No. 4,043,665 issued Aug. 23, 1977 to J. R. Caldwell, and U.S. Pat. No. 4,132,401 issued Jan. 2, 1979 to J. F. Gauronski, et al., this can be done by upstream preregistering the document to a vacuum transport belt with off-platen pre-registration fingers or rollers, and optical sensors, and then moving the document a fixed distance over the platen on the belt into registration, providing there is no slippage during this entire movement between the document and the belt. However, as indicated, more typically registration is provided by registration fingers, gates or stop edges aligned along the one edge of the platen to physically stop and register the document in its copying position without such transport criticality. In the latter case the document transport can slip briefly relative to a document striking the stop until deskewing and full registration is achieved.

Examples of such retractable registration finger or gate systems are disclosed, for example, in the references cited in the above-cited U.S. Pat. 4,043,665 (supra). U.S. Pat. No. 3,941,376 issued Mar. 2, 1976 shows one with a reversible single belt. U.S. Pat. 3,844,552 issued Oct. 29, 1974 to C. D. Bleau et al. shows plural registration fingers extendible between plural document belts at a beveled edge of the platen. Another retractable gate (73,74) system is shown, in a recirculating document handler, in U.S. Pat. No. 4,169,674 issued Oct. 2, 1979 to M. J. Russel.

Examples of document handling systems in which the document is registered on the platen using a fixed (non-retractable) registration stop against which the document is driven by a transport are disclosed, for example, in the following U.S. Pat. Nos. 4,146,220 issued Mar. 27, 1979 to P. Barton; 3,504,908 issued Apr. 7, 1970 to J. R. Krueger; and 4,033,574 issued July 5, 1977 to K. K. Stange.

As noted, the use of a fixed stop projecting above the plane of the platen as disclosed in such references has the potential for allowing this same registration edge to be utilized for manual registration of a document as well. However, it has the significant disadvantage, that, if this registration edge is not retracted, the document cannot be readily fed over it by the same transport, unless part of the transport is lifted. This conventionally limits the document feeding path for a fixed registration edge document handler to one of two reversing document motion types.

In one type the document is fed forward onto the platen over an upstream raised registration edge, and then the document belt is reversed in direction, while it is held down, to drive the rear or trail edge of the document into alignment with this upstream fixed registration edge. Then after copying, the document belt must be reversed again to resume its forward motion to eject the document from the downstram side of the platen. Note, e.g., U.S. Pat. No. 3,504,908 cited above.

In the other type, the fixed (permanently raised) registration edge is located at the downstream end of the platen. The document is registered by driving it downstream across the platen into the downstream registration edge. Then, after copying, the document transport is reversed in direction to feed the document back off from the upstream end of the platen. A disadvantage of this type is that since the document is being fed off from the same side of the platen from which it was fed on, only one document at a time can be handled by an overplaten document belt transport. That is, the subsequent document cannot be fed onto the platen until the preceding document is ejected from the platen by the belt. With such a "Y" shaped bi-directional platen transport system the documents cannot be recirculated in a uni-direction endless loop to and from the platen. This normally requires either a longer document changing time or a faster document transport.

For the above reasons, the use of retractable registration edges has been generally preferred for modern high speed document handling systems. This allows the document to be fed off the downstream side of the platen over the retracted registration member while the next document is being fed on from the upstream side with the same, and a uni-directional, transport.

However, even such retractable registration stops have significant disadvantages. At the high document feeding speeds needed for the brief document exchange times available in a high copying rate copier, the impacts of the edges of the document sheets against any stop can damage them, especially on repeated circulations requiring repeated registration of the same document. Further, the retractable fingers may have timing or positioning difficulties in preventing escape or slippage of the document from between the fingers and the moving document transport belt, particularly for uniform single belts and for certain document weights and conditions. Also, if a document is stopped by only one out of two or more spaced registrations fingers, it can become skewed. Misregistration can cause image loss and edge or background effects, as noted above. Misregistration can also cause serious problems in the further transporting of the document. Slippage can cause wrinkling, abrasion, ink smearing, or tearing of the original documents, especially if they are accidentally driven over raised registration fingers by the document belt. Additionally, in a movable registration gate, there is typically a small gap between the registration gate and the edge of the platen. The edge of the platen glass is typically beveled to allow the registration gate to slide over it at an acute angle relative to the upper surface of the platen to help capture the document, as in U.S. Pat. No. 3,844,552 cited above. Thus, the document lead edge, particularly if it is downwardly curled, can become caught in this space between the registration gate and the end of the platen and pulled downwardly into this space as the registration gate is retracted.

The present invention is not limited to any particular or specific type of document illumination or optics system, and is applicable to, for example, either scanning lamp (stationary document) copying, or moving document (stationary optics) copying. However, it is particularly suitable for full frame flash imaging, in which the document is copied after being registered at a registration position overlying a full size platen. In such copying, flash illumination of the document from a light reflective (light integrating) optical cavity below the platen is particularly desirable. An example of one such illumination system is disclosed in U.S. Pat. No. 4,250,538 issued Feb. 10, 1981 to John A. Durbin, et al. and its cited art.

The prior art also includes various other patents teaching recirculating or non-recirculating document handlers and control systems therefor, such as U.S. Pat. Nos. 4,062,061; 4,076,408; 4,078,787; 4,099,860; 4,125,325; 4,132,401 (supra); 4,144,550; 4,158,500; 4,176,945; 4,179,215; 4,229,101; 4,278,344; and 4,284,270.

Conventional simple software instructions in the copier's general microprocessor logic circuitry and software of document handler and copier control functions and logic, as taught by the above and other patents and various commercial copiers, is well known and preferred. However, it will be appreciated that the document feeding functions and systems disclosed herein may be alternatively conventionally incorporated into a copier utilizing any other suitable or known software or hard wired logic systems, cam-bank switch controllers, etc.

U.S. Pat. No. 4,286,870 issued Sept. 1, 1981 and filed Jan. 10, 1980 by the same inventor and assignee teaches a relevant vacuum belt document transport system and teaches preregistering document sheets over spaced apart vacuum areas of the document belt.

Of particular interest is the optical detection system e.g. reference No. 45) shown in U.S. Pat. No. 4,281,919 issued August 4, 1981 to A. Nomura, et al. (Canon) for detecting the original document at the exposure station. Also, the Canon "6300" copier commercially utilizes an optical a detector behind a white shuttered aperture in the platen cover over the platen, which shutter opens to let the detector look down at the platen for a document. This shutter then closes during copying to reduce or avoid exposure of the optical detector and its aperture since it is within the field of view of the copier lens.

Also of interest for prior copier optical document sensing apparatus are U.S. Pat. Nos. 3,473,035 issued Oct. 14, 1969 to J. F. Gardner, et al.; 4,200,391 issued Apr. 29, 1980 to K. Sakamato (Ricoh); and Japanese Utility Model laid-open Nov. 8, 1980 as No. 55-155250, Application No. 54-55087 Apr.23, 1979 (Sharp.) Other photosensing systems for detecting an edge of a web or sheet are taught in U.S. Pat. Nos. 2,904,700; 3,108,727; and 4,146,797.

Two "Xerox Disclosure Journal" publications, both in Vol. 6, No. 4, July/August 1981, at pages 185–186 and 199–200, teach optical document lead edge sensors.

Examples of the use of spectral reflective surfaces over or adjacent a copier platen for different purposes are taught in U.S. Pat. Nos. 3,998,541 issued Dec. 21, 1976 to A. J. Michaloski and 4,118,119 issued Oct. 3, 1978 to D. J. Maiorano (Xerox).

U.S. Pat. Nos. 4,000,943 issued Jan. 4, 1977 to Ari Bar-On and 4,283,773 issued August 11, 1981 to J. W. Daughton (Xerox) have examples of a servomotor driven document handling system.

All references cited are also incorporated by reference herein for appropriate teachings of additional or alternative details, features, and/or technical background.

The present invention overcomes or minimizes various of the above-discussed problems. A preferred feature of the invention disclosed herein is to provide, in an original document sheet feeding and registration apparatus for a copier, in which a document sheet is fed with a document feeding belt having a diffusely light reflective surface over a transparent platen imaging station of the copier (said imaging station having a document illumination exposure system and a copying lens systm under the platen) the improvement comprising: at least one minor spectrally reflective patch on said otherwise diffusely light reflective surface of said document belt, means for feeding the document sheets onto said belt in synchronism with said spectral patches such that at least one edge of the document sheet only partially overlies said patch and a portion of said spectral patch is exposed, and a photosensor system for detecting an edge of the document sheet while the document sheet is over said platen and within said imaging station and within the field of view of said lens system, said photosensor system being optically invisible to said copier, said photosensor system comprising sensor illumination means distinct from said exposure illumination system and photosensor means aimed at a registration position on said platen for detecting changes in the light level from said sensor illumination means reflected from said spectral patch, and wherein said photosensor system detects the arrival of a document sheet edge at said registration position by sensing the transition in intensity of the reflected illumination from a spectral patch at said registration position versus the reflected illumination from a document sheet partially overlying said spectral patch at said registration position.

Also disclosed hereinbelow are further features such as: wherein said belt has more than one said spectral patches, spaced along said document belt from one another in the direction of movement of said document belt by a distance corresponding generally to a dimension of a document sheet; wherein said plural spectral patches are positioned to partially underlie both the lead edge area and trail edge area of a single document sheet for detecting with said photosensor system the passage of both the lead edge and trail edge of the document sheet past said registration position; or wherein said registration position is adjacent one edge of said platen; or wherein in said photosensor system, the angle of incidence of illumination from said sensor illumination means is equal to the angle of reflection to said photosensor means from a spectral patch at said registration position, for maximizing, at said registration position, the reflectance of a spectral patch from said sensor illumination means into said photosensor means relative to the diffuse reflection from a document sheet or said document belt surface at said registration position; or wherein said sensor illumination means and said photosensor means are both positioned under said platen and out of the field of view of said lens system of said imaging station; or wherein said imaging station of said copier includes an integrating light reflective optical cavity underlying said platen containing said exposure illumination system for providing uniform diffuse reflection of light from said exposure illumination system onto a document sheet on said platen, and wherein said photosensor system is mounted in said light integrating optical cavity; or wherein said photosensor system is connected to a synchronizing means to control the movement of said document feeding belt; or wherein said photosensor system is connected to stop said document belt at a document imaging position controlled by the detection of an edge of a document sheet by said photosensor system at said registration position to register said document sheet with said lens system over said platen; or wherein said document sheet registration is provided by said stopping of said document belt at a position controlled by said photosensor system over the platen without any obstruction of the document sheet, and without any slippage between said document belt and the document sheet; or wherein said document feeding belt has shallow vacuum apertured vacuum grooves, and said spectral patches are spectral coatings or selected surfaces of selected said grooves.

Further features and advantages of the present invention pertain to the particular apparatus and steps whereby the abovementioned features or advantages may be attained.

The invention will be better understood by reference to the following description of specific examples thereof, which includes the following drawing figures (approximately to scale) wherein:

FIG. 1 is a cross-sectional schematic side view of an exemplary copier document handling and imaging apparatus incorporating an example of a document registration apparatus in accordance with the present invention;

FIG. 2 is a partial bottom view along the lines 2—2 of FIG. 1;

FIG. 3 is an enlarged partial bottom view of an exemplary or alternative vacuum belt for the apparatus of FIGS. 1 and 2; and FIG. 4 is a cross-sectional side view along the lines 4—4 of FIG. 3.

Various of the following descriptions of FIGS. 1 and 2 are also applicable to the subsequent descriptions of FIGS. 3 and 4 herein.

Referring first to the embodiment of FIGS. 1 and 2, it is shown with one example of an automatic recirculating document feeder transport 10 on a copier 12. The transport 10 has a belt 11 which moves original document sheets 14 seriatim in a movement path over the transport copying window or platen 16 of the coper 12, for registering and providing a copying background for the documents and then ejecting them from the platen 16.

Since the copier 12 may be any of various known types, it is only disclosed here to the extent that this document handling unit 10 interfaces therewith. Here a document sheet 14 is preferably exposed on the platen 16 by a flash lamp or lamps in a light integrating (white diffuse) chamber 22 under the platen. The image of the document thus uniformly illuminated is conventionally focused through a fixed lens 20 onto the conventional photoreceptor of the copier (not shown), for development and transfer to a registered copy sheet preferably as further described in the above-cited U.S. Pat. No. 4,250,538 and other cited references.

The side of the document (parallel the direction of document motion) may be registered against (along) an edge guide 17, if desired. However, the registration of the document to the orthogonal axis, a line 19 transverse the direction of document motion, requires critically locating, and preferably stopping, the document motion at that registration line 19. The registration line can be an alignment position for either the lead or trail edge of the document. Here it is for the lead edge.

The disclosed apparatus generally includes a novel photo-detector system 30 and/or 43 for detecting the accurate location of the lead or trail edge of a document sheet over the platen and shortly in advance of the desired registration or stopping position for the document. The present system can locate the lead edge of a document sheet even though it is backed with a "white" vacuum belt, and even though the sensor is looking up at the belt rather than down through a (undesirable) hole in the belt. Specular (mirror-like) reflective small areas or patches 38, 44, 54 are attached to or painted onto the vacuum belt in the area of the vacuum belt onto which the document lead edge is loaded or preregistered. (These patches may be optionally at the base of vacuum grooves as in FIGS. 3 and 4). This results in a significant distinguishing difference in the reflectivity of the belt in the spectral areas versus a document surface (which is almost always light scattering). This enables the lead edge of the document to be detected by a photocell system under the platen and within the optical cavity close to the front or rear registration edge positions of the document, even though both the document and its supporting document belt are both highly diffusely light reflective, i.e. "white". That is, the lead edge of the document sheet can be readily electronically distinguished from a directly adjacent spectral reflective surface area 38 on the overlying belt because all conventional or normal documents have a light scattering (diffusing) surface even in their unprinted (white) areas. Also, unlike various of the above-cited references, the present systems can also detect dark, e.g. printed or colored, document edges. Also, the particular configuration here of specular patches or stripes 38, 44 or 54 will not print out on the copy as "show-around" or background, especially with an integrating optical cavity illumination system. That is, there will be no perceived difference in the exposure (photoreceptor discharge) from these areas which would print out, since here these specular areas are always "off-axis" from the copying lens during copying, i.e. near the edge of the platen. Thus, during document imaging exposure, the exposed portion of the reflective patch 38 is imaged merely as a normal "white" region, because the lens only "sees" the uniform diffuse light reflection of an integrating cavity wall in this exposed portion of the specular patch, with integrating cavity document illumination. In contrast, these same specular areas 38, 44, 54 here are on-axis the separate light transmitter and receiver light path of the edge photodetector unit to provide maximum reflectivity from the specular areas into the photodetector.

If desired, a continuous specular stripe 44 or 54 can be used. Preferably, the stripe 44 would be adjacent to the rear registration edge, as shown. However, any spectral stripe or patch should avoid extending into any region where the lens 20 can "see itself" in the spectral area when it is not covered with paper. That could result in the specular region being imaged as a dark region on the copy sheet.

Thus, with the present system the document position can be accurately determined (and thus controlled) directly on the white document belt and inside the imaging (viewing) area of the copier, and from underneath the copying platen. No undesirable slots in the transport belt, or shutters therefor, are required. Heretofore this had been taught, to allow the photodetector to look down at the document, in order to provide sufficient optical contrast with "white" documents by looking "down" into a darkened area, e.g. towards the copying lens with the copying illumination system turned off.

Referring first particularly to FIG. 1 the document feeder 10 may be of the type disclosed in the above-cited references relating to recirculating document handlers. Here the drive for belt 11 is preferably a commercial servomotor drive to conveniently allow more controlled stopping the belt at the desired position. This control may be through conventional software programming of the conventional copier microprocessor control, or a portion thereof, or other simple circuitry, here identified for convenience as synchronizing circuit 39. However the particular document feeder or its drives are not important to the present invention.

Referring to the photosensor system 30, which is one of two photosensor systems 30 and 43 illustrated in FIG. 1, this photosensor system 30 is a commercial integral unit having a sensor illumination source 32 alongside of a photosensor or photodetector 36 which receives the light from the source 32 as reflected through a reflective light path 34. Here the path 34 is perpendicular the surface of belt 11. Note that this sensor illumination source 32 is different and independent from the flash exposure illumination source 18 with which the documents are copied. As may be seen from the FIG. 1, the field of view of the copying lens 20, illustrated by the broken lines extending therefrom to the platen, encompasses the entire area of the platen 16 on which the document sheet 14 is to be exposed and copied. This field of view extends to the lead edge registration line 19 on the downstream side of the platen, to which position 19 the lead edge of the document sheet is to be aligned when copying occurs (unless the copier uses trail edge registration). This copying lens 20 field of view here also extends to or beyond the trail edge of the same document adjacent the opposite (upstream) side of the platen.

It is important to note that the entire photosensor system 30 is positioned within the illumination integrating optical cavity 22 but outside this field of view of the lens 20. Therefore the system 30 cannot be seen by the lens 20 or copied onto the copy sheet or create a shadow or other mark thereon. Yet this photosensor system 30 is focused through its reflective light path 34 to accurately detect, through the platen 16, the position of the lead edge document at a lead edge registration positon 21, which position 21 is within the field of view of the lens 20 i.e. is upstream of the registration line 19. The reflective light path 34 is aligned and focused on this desired preselected registration position 21. It provides an angle of incidence equal to the angle of reflection so that a spectral patch 38 on the belt 11, (which will be parallel to the platen) provides a direct mirror reflection of focused light from the sensor source 32 into the photosensor 36.

Thus, the photosensor 36 sees a high intensity (concentrated) light increase as the special patch passes the registration position 21 until the lead edge of the document thereon passes the same point 21 at which point the light will drop sharply as perceived by the photosensor 36 to provide a discreet electrical signal indicating the presence of the lead edge of the document at position 21. The position 21 is sufficiently spaced upstream from the desired imaging or stopping registration line 19 to allow sufficient time for the belt drive to stop the belt 11 and the document thereon with the document lead edge at position 19.

While the document is being copied, the next document may be fed by the document feeder 10, (from the stack of documents shown) onto the belt 11. As described, the document is fed so that the lead edge thereof partially, but not completely, overlaps the next spectral patch 38 on the belt 11. However, this initial feeding or preregistration of the document sheet to the patch is not critical, since the patch may be relatively large, e.g. several centimeters in the direction of belt movement. That is, it is not necessary that the document intersect the middle of the patch, only that the document edge fall somewhere within the patch area. Note that the photosensor system 30 (or 43) may be utilized to directly control this feeding of this next document sheet as an additional function thereof. Alternatively, this feeding of the subsequent sheet may be controlled by holes or other indicia on the belt, or after a fixed time delay built into the synchronizing circuit 39. Various other means may be used for so feeding the document sheets onto the belt in synchronism with a spectral patch such that at least one edge of the document sheet only partially overlies the patch (leaving a portion of the spectral patch exposed).

It is alternatively or additionally desirable to provide a document trail edge sensor system, illustrated here by a second sensor illumination source 40 reflecting light into a second photosensor 42 defining a second photosensor system or unit 43. It may be seen that here the light source 40 is on one side of the optical integrating cavity 22 and focused through an associated lens at an angle to the belt 11 and the platen 16 onto a second (trail edge) registration position 46. This sensor light 40 may then be reflected at an equal angle from a spectral patch, e.g. 44 at that position 46 into a second photosensor 42 at the opposite side of the optical cavity. Again, it may be seen that both components of the sensing unit 43 are outside of the field of view of lens 20 and therefore optically invisible to the copier. Likewise it may be seen that the second registration position 46, like the first registration position 21, is "off axis" from the center line or central axis of the lens 20. This is because both positions 21 and 46 are adjacent the edges of the platen rather than centrally thereof. Thus, these are both positons in which a spectral patch will not be seen by the lens 20 as having any significant difference in reflectivity, even if exposed, from the regular (diffusely deflective) major area 37 of the belt 11.

Referring in particular to the exemplary spectral patches 38 and 44 here, as previously described these may be applied to or painted on the otherwise conventional diffusely reflective white surface 37 of the belt 11. They may comprise, for example, silver or gold foil or paint or thin commercially available Mylar reflecting tape or other anodized metallic plastic or the like reflective strips, cut to size and cemented on the belt surface 37. The only restriction is that these spectral patches not interfere with, i.e. be compatible with, the other properties of the belt for normal document feeding, and, as described, that they be sufficiently spaced apart such that they will not be in the center of the platen, i.e. not on-axis the lens 20 during exposure in the event that the document is not present, or is undersized, or has a transparent portion in the center thereof.

As noted, it is preferable to have the photosensor light sources 32, 40 focused through a lens onto a small spot on the plane of the belt surface 46 at registration points 21, 46. As reflected, this spot may diverge somewhat before reaching the photosensors 36 and 42. The sensors may be adapted with a gathering lens or relatively larger photosensor area to pick up a somewhat widened beam at that point. That is, the photosensors 36, 42 themselves need not be restricted to an extremely narrow field of view nor is it necessary that the sensor light be focused thereon directly. For example, the light from the sensor source 32 or 40 may be focused to a spot of approximately 1 millimeter at the document belt or document surface but may then diverge to an area of several millimeters at the photosensors 36 or 42. Almost all of this light will be reflected from a spectral surface, less only losses through the platen glass (which may be reduced by appropriate anti-reflective coatings). In contrast, only a small percentage of this light will be seen by the photosensors when a document is present or when the non-spectral portion of the belt is present at the registration positions.

Referring particularly to the second spectral patch or stripe 44 as shown particularly in FIG. 2, it may be seen that here it is spaced along the belt in the direction of belt motion from the first spectral patch 38 by a distance corresponding generally to the dimension of the document sheet 14 so as to partially underlie both the lead edge area and the trail edge area of a single document sheet, for detecting the passage of both. Both patches may be used for detection of both edges by either sensor if desired. For example, the further passage of the stripe 44 past the first sensor 30 can signal that the document is being successfully ejected from the platen i.e. providing an indication of proper or improper feeding (detecting a document jam on the platen).

Note that even if the document is undersized and the lead edge of the undersized document is registered to the first or lead edge patch 38, that the second patch 44 (which will be totally uncovered for an undersized document) will still provide a signal of its passage, and a signal indicating the absence of a document thereover, to one or both sensors. The total absence of a document from a patch can be readily detected from the fact that the speed of movement of the document belt is a known (constant) factor, as is the dimensions of each patch in the direction of movement of the belt. Thus, even with no document present, the photosensors provide an increased output signal as soon as the lead edge of a patch passes thereover, which increased output will continue for a known and constant time duration pulse length during the further movement of the document belt. When a document partly overlies the patch this pulse length will be correspondingly shorter and distinguishable therefrom.

Either or both photosensor systems herein can be connected through the synchronizing circuit 39 or other suitable simple circuitry to stop the document belt at desired document imaging position controlled by the detection of either edge of the document sheet by the photosensor system, thereby registering a document sheet in proper copying position with the lens system over the platen. The document sheet registration is thereby provided solely under the control of the photosensor system and without any mechanical obstruction of the document sheet and without any slippage between the document belt and the document sheet. Thus, as previously noted, with this system there is no need to strike the lead edge of the document against any registration edge or gate or fingers. Thus more delicate or brittle documents may be circulated, and even regular documents may be circulated more often, to make more copy sets, with reduced wear or damage, especially to the lead edge.

Referring now to FIGS. 3 and 4, they are an enlarged bottom view and cross-sectional view, respectively, of the belt 11 or an alternative thereto. This is a belt having vacuum grooves 50 and vacuum apertures 52 therein as further described in the above-cited U.S. Pat. No. 4,286,870. These grooves preferably extend across the belt surface transverse the direction of motion thereto and with the document overlying all but the leading grooves. Accordingly, as illustrated in FIGS. 3 and 4, spectral areas 54 may be provided by applying a spectral coating to selected bottom surfaces of selected said grooves 50, in locations spaced along the belt as described above for the other spectral patches 38 or 44. This has the additional advantage that the spectral areas 54, being slightly recessed below the belt non-spectral surface 37, are more protected from contamination or abrasion. As another feature, if a series of adjacent grooves 50 are so spectrally coated, the photosensor output will be a countable series of pulses corresponding to the number of exposed grooves 50 with spectral patches 54 passing a registration point. I.e. the total number of reflective grooves minus the number covered by the document 14 lead or trail edge area.

It will be appreciated that the embodiments described herein are merely exemplary and other variations, modifications, refinements, or alternative embodiments may be provided by those skilled in the art. They are intended to be encompassed by the following claims:

I claim:

1. In an original document sheet feeding and registration apparatus for a copier, in which a document sheet is fed with a document feeding belt having a diffusely light reflective surface over a transparent platen imaging station of the copier, said imaging station having a document illumination exposure system and a copying lens system under the platen, the improvement comprising:

at least one minor spectrally reflective patch on said otherwise diffusely light reflective surface of said document belt, means for feeding the document sheets onto said belt in synchronism with said spectral patches such that at least one edge of the document sheet only partially overlies said patch and a portion of said spectral patch is exposed, and a photosensor system for detecting an edge of the document sheet while the document sheet is over said platen and within said imaging station and within the field of view of said lens system, said photosensor system being optically invisible to said copier, said photosensor system comprising sensor illumination means distinct from said exposure illumination system and photosensor means aimed at a registration position on said platen for detecting changes in the light level from said sensor illumination means reflected from said spectral patch, and wherein said photosensor system detects the arrival of a document sheet edge at said registration position by sensing the transition in intensity of the reflected illumination from a spectral patch at said registration position versus the reflected illumination from a document sheet partially overlying said spectral patch at said registration position.

2. The apparatus according to claim 1 wherein said belt has more than one said spectral patches, spaced along said document belt from one another in the direction of movement of said document belt by a distance corresponding generally to a dimension of a document sheet.

3. The apparatus according to claim 2 wherein said plural spectral patches are positioned to partially underlie both the lead edge area and trail edge area of a single document sheet for detecting with said photosensor system the passage of both the lead edge and trail edge of the document sheet past said registration position.

4. The apparatus according to claims 1, 2 or 3 wherein said registration position is adjacent one edge of said platen.

5. The apparatus of claims 1, 2 or 3 wherein in said photosensor system, the angle of incidence of illumination from said sensor illumination means is equal to the angle of reflection to said photosensor means from a spectral patch at said registration position, for maximizing, at said registration position, the reflectance of a spectral patch from said sensor illumination means into said photosensor means relative to the diffuse reflection from a document sheet or said document belt surface at said registration position.

6. The apparatus according to claims 1, 2 or 3 wherein said sensor illumination means and said photosensor means are both positioned under said platen and out of the field of view of said lens system of said imaging station.

7. The apparatus according to claims 1, 2 or 3 wherein said imaging station of said copier includes an integrating light reflective optical cavity underlying said platen containing said exposure illumination system for providing uniform diffuse reflection of light from said exposure illumination system onto a document sheet on said platen, and wherein said photosensor system is mounted in said light integrating optical cavity.

8. The apparatus according to claims 1, 2 or 3 wherein said photosensor system is connected to a synchronizing means to control the movement of said document feeding belt.

9. The apparatus according to claims 1, 2 or 3 wherein said photosensor system is connected to stop said document belt at a document imaging position controlled by the detection of an edge of a document sheet by said photosensor system at said registration position to register said document sheet with said lens system over said platen.

10. The apparatus according to claim 9 wherein said document sheet registration is provided by said stopping of said document belt at a position controlled by said photosensor system over the platen without any obstruction of the document sheet, and without any slippage between said document belt and the document sheet.

11. The apparatus according to claim 10 wherein said registration position is adjacent one edge of said platen, wherein in said photosensor system, the angle of incidence of illumination from said sensor illumination means is equal to the angle of reflection to said photosensor means from a spectral patch at said registration position, for maximizing, at said registration position, the reflection of a spectral patch from said sensor illumination means into said photosensor means relative to the diffuse reflection from a document sheet or said document belt surface at said registration position, wherein said sensor illumination means and said photosensor means are both positioned under said platen and out of the field of view of said lens system of said imaging station, and wherein said imaging station of said copier includes an integrating light reflective optical cavity underlying said platen containing said exposure illumination system for providing uniform diffuse reflection of light from said exposure illumination system onto a document sheet on said platen, and wherein said photosensor system is mounted in said light integrating optical cavity.

12. The apparatus according to claims 1, 2 or 3 wherein said document feeding belt has shallow vacuum apertured vacuum grooves, and said spectral patches are spectral coatings on selected surfaces of selected said grooves.

* * * * *